Dec. 13, 1938.    W. H. WINEMAN    2,139,708
METHOD OF AND APPARATUS FOR SEPARATING LAMINATED SHEETS
Filed Dec. 24, 1935    2 Sheets-Sheet 1
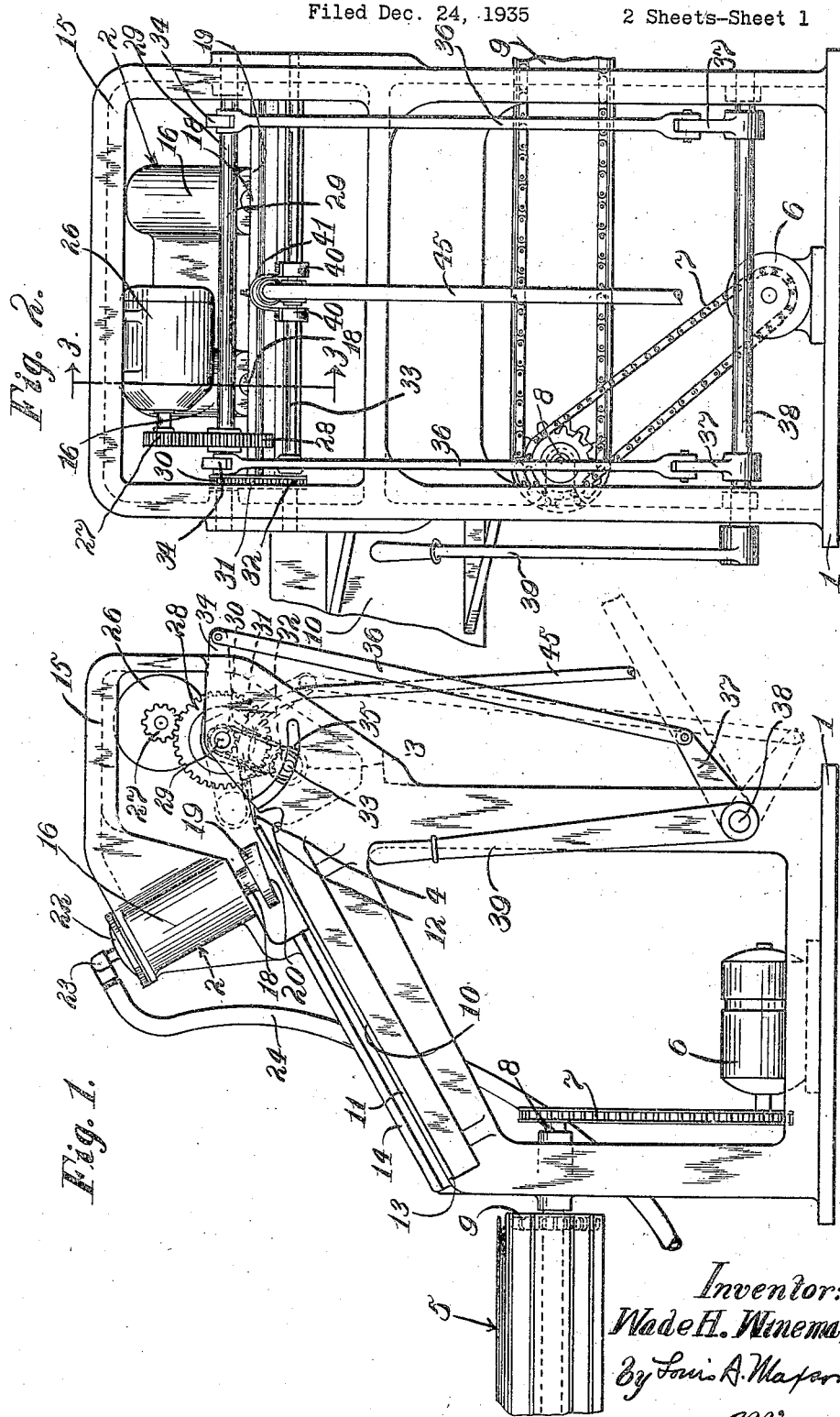
Inventor:
Wade H. Wineman
By Louis A. Mason
Atty.

Dec. 13, 1938.   W. H. WINEMAN   2,139,708
METHOD OF AND APPARATUS FOR SEPARATING LAMINATED SHEETS
Filed Dec. 24, 1935   2 Sheets-Sheet 2
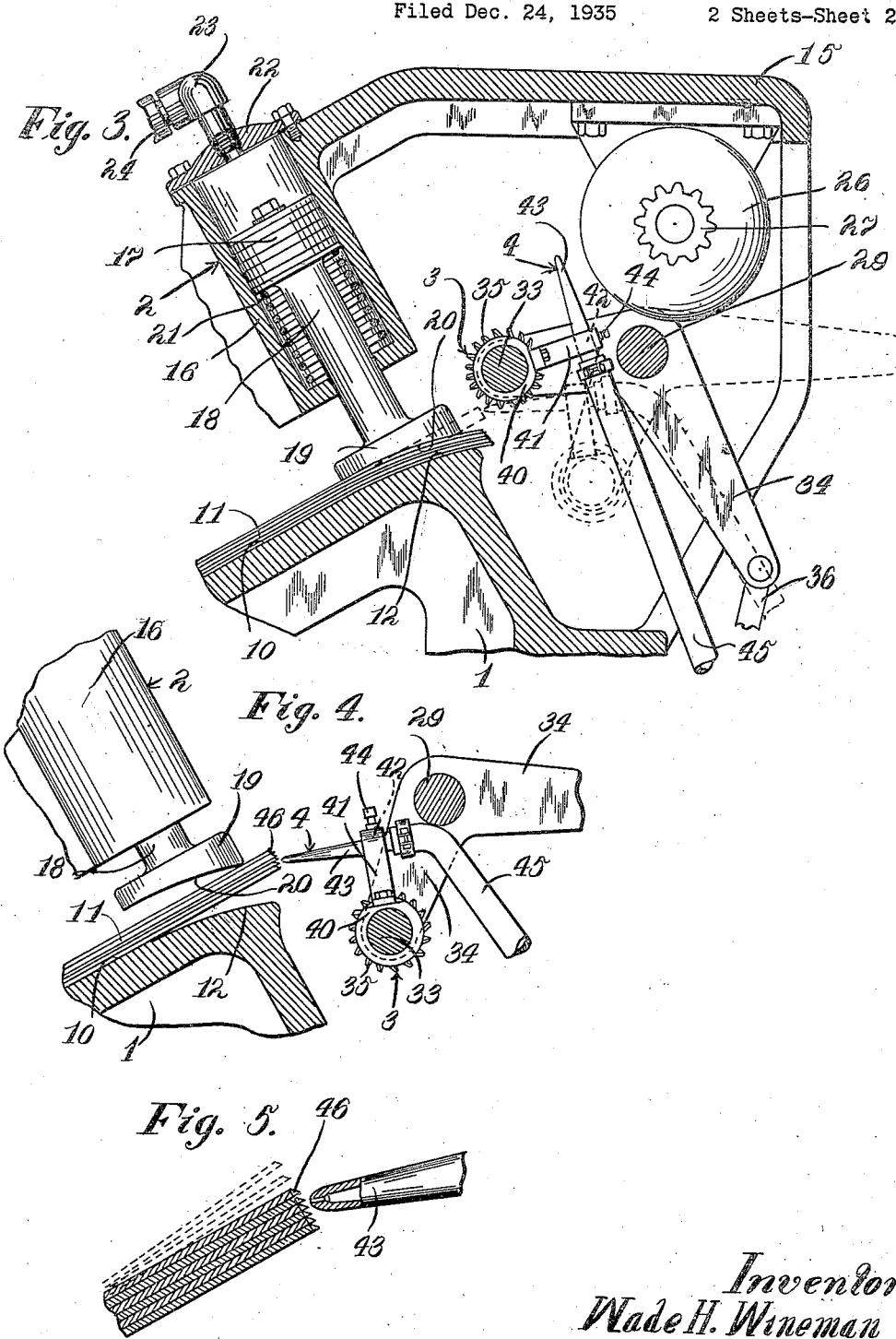
Inventor:
Wade H. Wineman
By Louis A. Maxson
Atty.

Patented Dec. 13, 1938

2,139,708

UNITED STATES PATENT OFFICE 2,139,708

METHOD OF AND APPARATUS FOR SEPARATING LAMINATED SHEETS

Wade H. Wineman, Michigan City, Ind., assignor to Sullivan Machinery Company, a corporation of Massachusetts Application December 24, 1935, Serial No. 56,123

9 Claims. (Cl. 29—17)

This invention relates to methods of and apparatus for separating thin laminated sheets, and more particularly relates to improved apparatus used in the manufacture of tin or other plate for separating the thin laminated sheets, and improved methods of use of such an apparatus.

In the manufacture of tin plate, the plates are usually formed by rolling sheet steel plates to a definite thickness, chemically treating the rolled plates, thereafter placing a number of the rolled plates together in superimposed relation to form a stack, and finally rolling out the stack of plates to form one laminated sheet. In the laminated sheet, each plate is quite thin, and after shearing the laminated plate to the proper size for tin plate, the laminations which firmly adhere together during the final rolling process, are torn apart or separated by hand, an extremely tedious and costly procedure.

An object of this invention is to provide an improved method of and apparatus for separating the thin plates from the laminated sheet in an improved and less expensive manner. Another object is to provide an improved plate separating apparatus embodying means for discharging a jet of compressed air between the sheets, the compressed air flowing between the plates, lifting and separating the same by the action of the air pressure thereon. A further object is to provide an improved plate separating apparatus embodying means for clamping the laminated sheet, means for roughening the edges of the plates and a high pressure air nozzle for discharging high pressure air between the roughened edges of the plates to effect lifting and separation of the sheets by the action of the air pressure thereon. A still further object is to provide an improved thin plate separating apparatus comprising an air pressure operated clamp for deflecting an end of a laminated plate sheet, a milling cutter for traversing the end face of the laminated sheet, while the latter is in deflected position, for beveling the edges of the plates, and means operative when the clamp is released for discharging a jet of high pressure air between the beveled edges of the plates to separate the latter. Still another object is to provide an improved air jet nozzle having an adjustable mounting whereby high pressure air may be directed between the plates of the laminated sheet so that upon adjustment of the jet the plates may be progressively separated by the action of the air pressure discharged therebetween. Other objects and advantages of the invention will, however, hereinafter more fully appear.

In the accompanying drawings, there is shown for purposes of illustration one form which the invention may assume in practice.

In these drawings,

Fig. 1 is a side elevational view of the illustrative form of the improved plate separating apparatus.

Fig. 2 is an end elevational view of the apparatus shown in Fig. 1.

Fig. 3 is an enlarged vertical sectional view taken substantially on line 3—3 of Fig. 2.

Fig. 4 is a fragmentary sectional view taken in the plane of Fig. 3, showing the clamp and air jet in a different position, parts being shown in elevation to facilitate illustration.

Fig. 5 is a detail sectional view showing the laminated sheet and air jet nozzle.

In this illustrative embodiment of the invention there is shown a plate separating apparatus generally comprising a base frame 1, clamping means generally designated 2, a cutter 3, air discharge means 4 and the associated plate conveyor generally designated 5. Mounted on the base frame 1 is a motor 6 having its power shaft connected through a chain and sprocket drive 7 to a drive shaft 8 for an endless conveyor 9 for conveying the separated plates away from the separating apparatus. The base frame 1 is formed with an inclined plane table 10 for receiving and supporting a laminated plate sheet 11, the upper portion of the table being arcuately formed or curved at 12. The lower end of the plane table is formed with a shoulder 13 against which the rear edge of the laminated plate sheet is adapted to rest in position on the inclined table, and one side of the table is provided with an overhanging ledge 14 for guiding the separated plates from the table onto the endless conveyor 9. Supported by a standard or upper frame 15 on the bed frame 1 is the clamping means 2, which may assume various forms, but which herein comprises a pair of air cylinders 16 each containing a reciprocable piston 17 having a piston rod 18 extending through the lower cylinder head and having attached thereto at their lower ends a clamping block 19, the latter having an arcuate lower surface 20 adapted to fit the curved table surface 12 when the clamping block is brought into its lowermost position in engagement with the table. Interposed between the lower cylinder heads and the pistons are coil springs 21 for constantly urging the clamping block toward its raised position. Connected to the upper cylinder heads 22 through suitable pipe connections 23 is a hose 24 leading to any suitable pressure fluid source. Supported by the upper portion of the standard or upper frame 15 is a motor 26 having fixed to its lower shaft a spur pinion 27 meshing with a spur gear 28 fixed to a shaft 29, this shaft extending transversely across the base frame and journaled at its ends within the vertical side walls of the standard 15. Fixed to the shaft 29 is a chain sprocket 30 connected through an endless chain 31 to a sprocket 32 fixed to a shaft 33 suitably journaled at its ends within vertically swingable levers 34 pivotally mounted on the shaft 29 at the opposite sides of the base frame standard. The ends of the shaft 33 are guided in arcuate slots formed in the vertical standard walls. Keyed to the shaft 33 is a suitable cutter, such as a conventional milling cutter 35. The pair of levers 34, 34 are connected through pivoted links 36, 36 to levers 37, 37 keyed to a horizontal transversely extending operating shaft 38 journaled within the sides of the base frame 1. Keyed to one end of the shaft 38 is a hand lever 39. When the operator swings the lever 39, the levers 34 are swung about their pivotal axes to move the milling cutter 35 in an arcuate path for a purpose to be later described. Supported by spaced bearing collars 40, 40 journaled on the shaft 33 at opposite sides of the milling cutter 35 is a bracket 41 having a socket 42 for receiving a suitable air discharge means such as an air jet nozzle 43, the nozzle being secured within the bracket socket by means of a set screw 44. A hose 45 is connected to the air jet nozzle 43 for supplying high pressure air therethrough from any suitable source of air pressure.

As previously mentioned, the plates are initially rolled to a definite thickness, then arranged in a stack and cut to size, and finally rolled into a laminated sheet, and when it is desired to separate the thin plates from the laminated sheet, the latter is placed on the inclined table 16 with its rear edge resting against the shoulder 13 and one side of the sheet underlying the lateral retaining ledge 14. When the laminated sheet is in position on the table, as shown in Fig. 1, air pressure is supplied through the hose connection 24 to the upper ends of the cylinders 16, the air pressure acting on the upper pressure areas of the pistons 17 to move the piston rods downwardly, and as a result, the clamping block 19 is moved into clamping engagement with the upper portion of the laminated sheet, the curved surface 20 of the clamping block bending or deflecting the upper edge of the laminated sheet against the curved surface of the table in the manner shown in Fig. 3. When the laminated sheet is so deflected, the operator grasps the handle 39 to swing the levers 34, 34 about their pivotal axes, thereby moving the milling cutter 35 in an arcuate path, the milling cutter traversing the edge of the deflected sheet, cutting across the latter. The milling cutter moves during its cutting operation from the full line position shown in Fig. 3 to the dotted line position in that figure. After the milling process, the air pressure is vented in a suitable manner from the upper ends of the clamping cylinders 16, the coil springs 21 moving the clamping block 19 into its raised position to release the sheet, and as a result, the laminated plate sheet springs back into its original position, as shown in Figs. 4 and 5. When the laminated sheet is in this position, the edges of the plates cut by the milling cutter are beveled as indicated at 46, thereby providing rough jagged edges at the upper ends of the plates. The operator then grasps the hose 45 and swings the nozzle supporting bracket about its pivotal axis relative to shaft 33, moving the nozzle 43 from the position shown in Fig. 3 to the position shown in Figs. 4 and 5, and thereafter air pressure is supplied through the hose 45 to the nozzle 43, the air discharging in a jet from the nozzle to act against the beveled ends of the plates, separating the latter by the action of the air pressure thereon. The air pressure as it is discharged between the plates acts to lift and separate the top plate from the sheet, the nozzle being moved progressively downwardly across the end of the sheet as the plates are separated, until the sheet is completely separated. The air pressure acting on the separated sheets tends to lift the latter, and as the plates drop from the table, they are guided by the overhanging ledge 14 onto the endless conveyor 9.

As a result of this invention, it will be noted that an improved apparatus is provided for separating thin plates from a laminated sheet, thereby eliminating the laborious task of manually separating the sheets and the inherent expense connected with such manual separation. It will further be noted that an improved method of and apparatus for separating thin laminated plates is provided whereby the plates are separated in an improved manner by the action of high pressure air thereon, the plate sheet being clamped in a deflected position, thereafter cut by a milling cutter, then released to its original position and finally the plates separated by the action of air pressure thereon discharged from a high pressure jet. Other uses and advantages of the improved method of and apparatus for separating thin plates will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a thin plate separating apparatus, a table for receiving a laminated sheet of thin plate, means engageable with the sheet for deflecting and holding in deflected position one end thereof, means movable relative to said deflecting and holding means for cutting the deflected end of the sheet, and means for discharging a jet of compressed air on the cut end of the sheet when the latter is released from its deflected position, to separate the laminations of the sheet by the action of compressed air thereon.

2. In a thin plate separating apparatus, a frame, an inclined table on said frame for receiving a laminated sheet of thin plate, the upper portion of the table being curved, a clamp on said frame for clamping the upper end of the sheet against the curved surface of the table to deflect said end of the sheet, a motor driven cutter, means for moving said cutter relative to said deflecting clamp and said table across the deflected end of the sheet, the sheet when released by said clamp springing back to its original flat position on the table, the cut end of the sheet providing beveled surfaces on the ends of the laminations, and a jet movable across the beveled ends of the laminations for discharging compressed air therebetween to separate the same by the action of the air pressure thereon.

3. In a thin plate separating apparatus, means for receiving and supporting a laminated sheet of thin plate, means for deflecting and holding in deflected position one end of the sheet, cutting means movable relative to said deflecting and holding means for cutting the deflected end of the sheet to provide beveled edges on the ends of the laminations when the sheet is released by said deflecting means, and means for discharging compressed air between the beveled edges of the laminations to separate the latter by the action of air pressure thereon.

4. In a thin plate separating apparatus, a table for receiving a laminated sheet of thin plate and having a curved surface over which one end of the sheet lies, a clamp having a curved surface of the same contour as said table surface and movable toward the latter surface to clamp the sheet between said surfaces, the sheet bending about said table surface when the same is clamped in position between said surfaces, a rotary power driven cutter mounted to move across the deflected end of the sheet to roughen the edges of the laminations thereof, and means for discharging compressed air between the roughened edges of the laminations when the deflected end of the sheet is released from the clamping action of said clamp.

5. In a thin plate separating apparatus, a table for receiving a laminated sheet of thin plate and having a curved surface over which one end of the sheet lies, a clamp having a curved surface of the same contour as said table surface and movable toward the latter surface to clamp the sheet between said surfaces, the sheet bending about said table surface when the same is clamped in position between said surfaces, a rotary power driven cutter mounted to move in an arcuate path across the deflected end of the sheet to roughen the edges of the laminations thereof, and means for discharging compressed air between the roughened edges of the laminations when the deflected end of the sheet is released from the clamping action of said clamp.

6. A method of separating a flat laminated sheet comprising the steps of arcuately bending and holding in bent position one end of the sheet, then traversing the held bent end of the sheet by a cutter to roughen the edges of the laminations, thereafter releasing the cut bent end of the sheet to permit the latter to spring back into its normal flat position, and finally discharging a jet of expansible fluid between the roughened cut ends of the laminations of the sheet to separate the laminations by the expansive action of the fluid thereon.

7. A method of separating a flat laminated sheet comprising the steps of arcuately bending and holding in bent position one end of the sheet, then roughing the held bent end of the sheet to roughen the edges of the laminations, thereafter releasing the bent roughened end of the sheet to permit the latter to spring back into its normal flat position, and finally discharging a jet of expansible fluid on the roughened end of the sheet between the roughened edges of the laminations to separate the laminations thereof by the expansive action of the fluid thereon.

8. In an apparatus for separating a laminated sheet, a support for receiving the laminated sheet and having a curved surface over which one end of said sheet lies, means for bending the end of the sheet over said curved surface and for holding it so bent, a roughing device mounted to move across the bent end of the sheet to roughen the ends of the laminations, and means for discharging an expansible fluid between the roughened ends of the laminations when the bent end of the sheet is released from the holding action of said bending means, to effect separation of the laminations thereof by the expansive action of the fluid thereon.

9. In an apparatus for separating a laminated sheet, a support for receiving the laminated sheet and having a curved surface over which one end of the sheet lies, means for bending said end of the sheet over said curved surface and for holding it so bent, a cutter mounted to move in an arcuate path across the bent end of the sheet to cut the ends of the laminations thereof, and means for discharging expansible fluid between the cut ends of the laminations when the bent end of the sheet is released from the holding action of said bending means, to effect separation of the laminations by the expansive action of the fluid thereon.

WADE H. WINEMAN.